United States Patent [19]

Besner

[11] Patent Number: 4,836,480
[45] Date of Patent: Jun. 6, 1989

[54] MULTI-PURPOSE SUPPORT FRAME FOR COOKING GRILL

[76] Inventor: Guy Besner, 552 Rue Principale, Ste. 107, P.O. Box 338, Lachute, Quebec, Canada, J8H 1Y1

[21] Appl. No.: 153,588
[22] Filed: Feb. 8, 1988
[51] Int. Cl.$^4$ .............................................. A47G 29/00
[52] U.S. Cl. .................... 248/125; 126/9 R; 126/25 A; 126/30; 248/161; 403/353
[58] Field of Search ............ 248/125, 161, 346; 126/25 AA, 25 A, 25 R, 30, 9 R, 9 B; 99/422

[56] References Cited

U.S. PATENT DOCUMENTS

| | | | |
|---|---|---|---|
| 1,915,727 | 6/1933 | Friedemann | 248/125 X |
| 2,523,200 | 9/1950 | Durst, Jr. | 248/125 X |
| 2,914,283 | 11/1959 | Jorgensen | 248/125 |
| 2,998,001 | 8/1961 | Lofgren et al. | 248/125 X |
| 3,043,440 | 7/1962 | Berlin | 248/161 X |
| 3,162,113 | 12/1964 | Tallaksen | 248/161 X |
| 3,498,210 | 3/1970 | O'Toole | 126/9 R |
| 4,328,783 | 5/1982 | Martenson | 126/25 R |
| 4,363,313 | 12/1982 | Smith | 126/25 AA X |
| 4,453,529 | 6/1984 | Spencer et al. | 126/25 R X |
| 4,548,193 | 10/1985 | Marogil | 126/25 A X |
| 4,628,896 | 12/1986 | Baynes | 126/25 R |

FOREIGN PATENT DOCUMENTS 127210  8/1928  Switzerland ................. 126/25 A

Primary Examiner—J. Franklin Foss
Assistant Examiner—David L. Talbott

[57] ABSTRACT

A multi-purpose support frame for supporting a cooking grill in an elevated position. The support frame comprises a support base with a support rod secured to the base and extending vertically above an end of the base. A support arm is secured to the rod and extends above and over the support base. The support arm has spaced-apart attachment elements for engaging cooperating parts of the grill for retaining the grill substantially horizontally above the support base. The grill is adjustably position in height above the support base by an adjustment member secured to the support rod. A handle is associated with the grill.

9 Claims, 3 Drawing Sheets

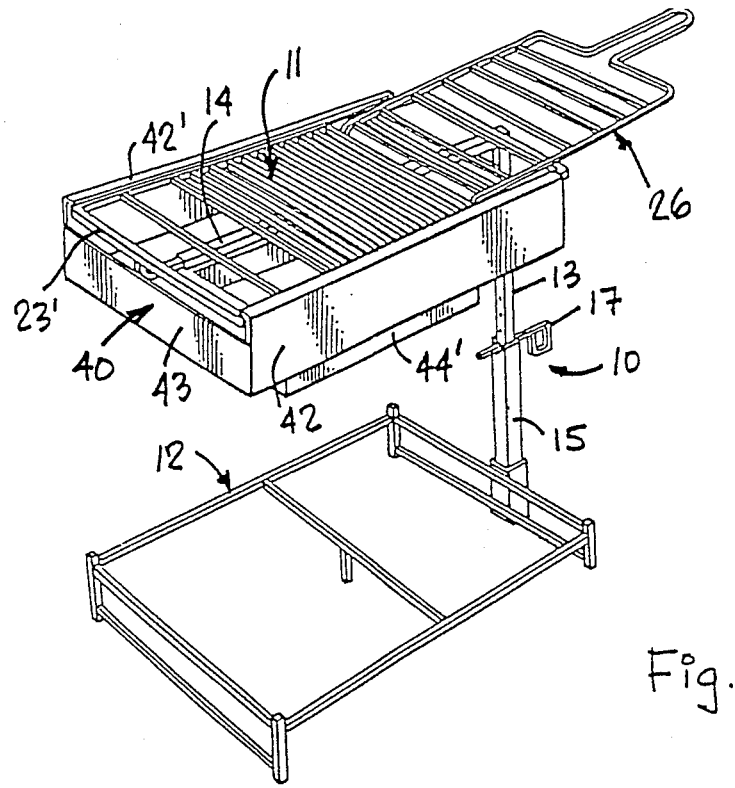
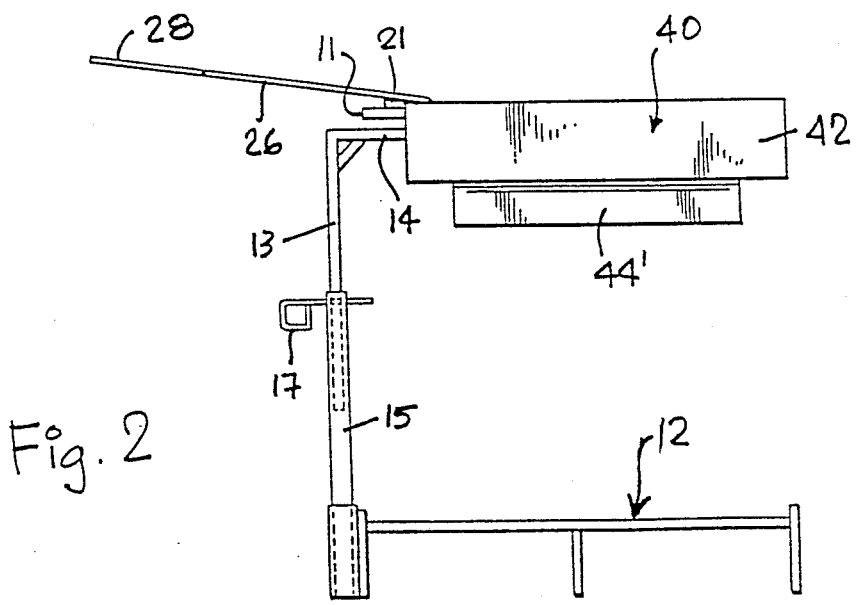

MULTI-PURPOSE SUPPORT FRAME FOR COOKING GRILL

BACKGROUND OF THE INVENTION

Field of Invention

The present invention relates to a multi-purpose support frame for supporting a cooking grill in an elevated position, either above a firewood support frame located therebelow or above a sliding tray removably attachable to the grill for supporting a combustible product in close proximity under the cooking grill. The frame is also disconnectible and packageable in a small container.

DESCRIPTION OF PRIOR ART

Various types of support frames are known whereby to support cooking pots above a fire. Usually such frames are permanently anchored or removably secured on a support surface adjacent a fire. Still further, known support frames do not provide an easy means for supporting a cooking grill above a firewood grate or simply above a fire on the ground surface.

SUMMARY OF INVENTION

It is a feature of the present invention to provide a multi-purpose improved support frame for supporting a cooking grill in an elevated position.

Another feature of the present invention is to provide a multi-purpose support frame for supporting a cooking grill in an elevated position above a firewood support frame.

Another feature of the present invention is to provide a multi-purpose support frame for supporting a cooking grill in an elevated position with a support tray detachably secured under the cooking grill and containing therein a combustible product.

Another feature of the present invention is to provide a multi-purpose support frame for supporting a cooking grill in an elevated position and wherein the cooking grill is provided with an extension grill surface formed integrally with a handle for removing the cooking grill from its engagement with the support frame, and to provide an extension of the surface of the cooking grill.

Another feature of the present invention is to provide a multi-purpose support frame for supporting a cooking grill in an elevated position, which position may be varied in height relative to a lower support frame.

According to the above features, from a broad aspect, the present invention provides a multi-purpose support frame for supporting a cooking grill in an elevated position. The support frame comprises a support base with a support rod secured to the base and extending vertically above an end of the base. A support arm is secured to the rod and extends above and over the support base. The support arm has spaced-apart attachment elements for engaging cooperating parts of the grill for retaining the grill substantially horizontally above the support base. The grill is adjustably positioned in height above the support base by an adjustment member secured to the support rod. A handle is associated with the grill.

BRIEF DESCRIPTION OF DRAWINGS

A preferred embodiment of the present invention will now be described with reference to the examples thereof illustrated in the accompanying drawings in which:

FIG. 1 is a perspective view of the multi-purpose support frame supporting a cooking grill in association with a combustible product support tray;

FIG. 2 is a side view of FIG. 1;

DESCRIPTION OF PREFERRED EMBODIMENTS

Figure 3:
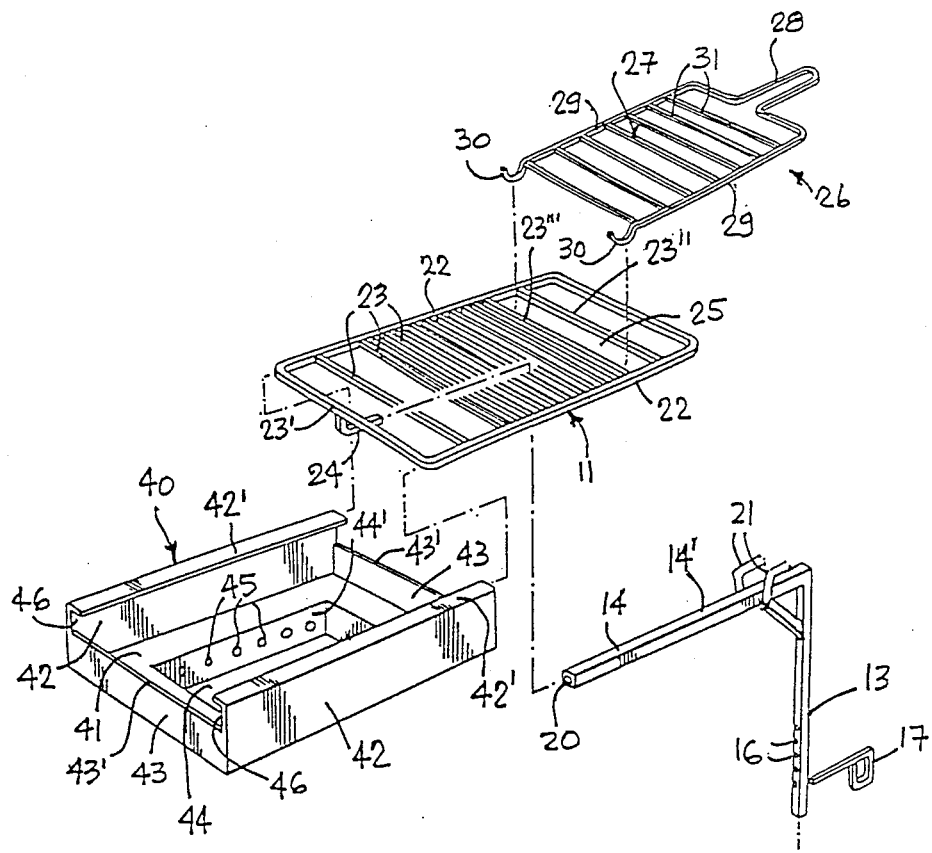
FIG. 3 is an exploded view of FIG. 1.

Referring to the drawings, and more particularly to FIGS. 1 to 3, there is shown generally at 10 the multi-purpose support frame of the present invention for supporting a cooking grill 11 in an elevated position above a support base 12. A support rod assembly 13 is secured to the base 12 and extends vertically above an end wall or end section 12' thereof. The support rod has a support arm 14 formed integral therewith and extending at right angles to the rod 13. The rod 13, as herein shown, is telescopically received within a lower sleeve portion 15 which is secured to the end wall 12' by welding, or other suitable means.

Figure 4:
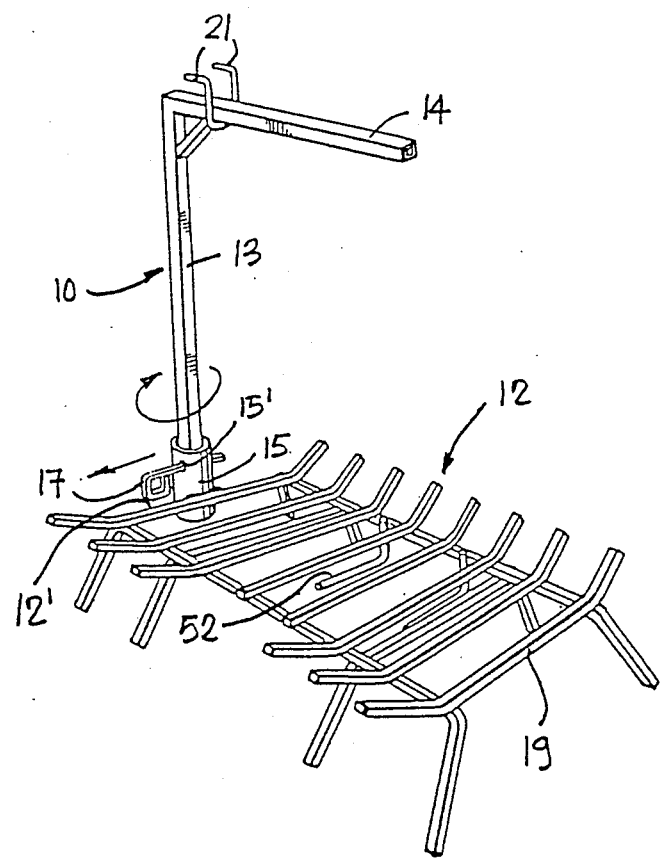
FIG. 4 is a perspective view showing the multi-purpose support frame in association with a firewood support grate.

As shown in FIG. 3, the rod 13 and the lower sleeve portion 15 are both of square cross-section, and a plurality of holes 16 are formed within the rod 13 to receive therethrough a support pin or lock pin 17 whereby to support the support arm 14 at a desired elevation from the base 12. In this particular embodiment the pin 17 would sit in a V-notch 18 formed in the top end of the lower sleeve portion 15. However, this pin 17 can extend through holes 15' in the lower sleeve portion, as shown in FIG. 4 to engage the rod 13. Also as shown in FIG. 4, the rod 13 can be rotatably displaced within the sleeve portion when the pin 17 is removed whereby to swing the support arm 14 away from the base 12 which is therein shown as a firewood support grate 19.

As shown more clearly in FIG. 3, the support arm 14 is provided with spaced-apart attachment means in the form of a bore 20 provided in a forward end of the support arm 14, and a pair of spaced-apart hook fingers 21 extending close to the rear end of the support arm. Each of the fingers 21 extends rearwardly and is spaced on a respective side and above the support arm whereby to engage the cooking grill 11 and maintain it rigid in a horizontal position on the support rod 14 above the base 12. As herein shown, the cooking grill comprises opposed substantially parallel outer edge wire rods 22 and a plurality of spaced transverse wire rods 23. At a forward end of the grill 11 there is provided an inwardly turned finger rod 24 secured to the outer end one 23' of the transverse wire rods. This finger rod 24 extends below and spaced from the horizontal plane of a cooking grill and disposed substantially parallel thereto. In order to attach the grill 11 to the support arm 14, it is firstly necessary to insert the finger rod 24 in the bore 20 and push it all the way therein until the pair of hook fingers 21 can protrude through the opening 25 in the grill 11. The grill is then pulled back or forward so that the fingers 21 overlie the transverse rod 23'" and in close frictional contact therewith to wedge the transverse rod 23' between the top surface 14' of the support rod 14 and the fingers 21. Also, the bore 20 and finger rod 24 are of like cross-section, as herein shown being of square cross-section, to prevent axial rotation of the finger rod within the bore thus preventing lateral displacement of the grill and supporting it rigidly in the horizontal plane.

The cooking grill 11 is also provided with a handle wire grill member 26. This member comprises a grill section 27 and a handle section 28. The grill section is formed by a pair of opposed, substantially parallel, wire rods 29 formed by a single rod section which is bent to form the handle 28 and the side rod sections 29. The free ends of the side rods 29 are also bent into a hook for engaging the transverse wire rod 23''' forward most of the opening 25 of the cooking grill 11. Thus, the grill section and handle engages the grill 11 and extends at a slight angle to the horizontal plane, as shown in FIG. 2, whereby the hot cooking grill 11 can be removed from the support rod 14. The grill section 27 is also provided with transverse wire rods 31 welded across the side rods 29 to constitute an extension of the grill on which foodstuff can be maintained warm or may be cooked by a fire therebelow when utilizing the support frame as a fire box or a support grate.

A support tray 40 may also be detachably secured under the cooking grill 11, as shown in FIGS. 1 to 3. This cooking tray comprises an open-ended rectangular metal box having a bottom wall 41, opposed side walls 42, and opposed end walls 43. The bottom wall has a recessed cavity 44 for receiving a combustible product (not shown) such as charcoal or other suitable combustible product. The recess cavity is provided with a circumferential side wall 44' having a plurality of perforations 45 therein constituting vent means to oxygenate the combustible product positioned within the cavity 44.

The opposed side walls 42 of the tray 40 extend above the top edge 43' of the end walls 43, and have an outer end edge portion 42' thereof which is bent inwardly of the tray and extend substantially parallel to the bottom wall 41 whereby to form an open-ended channel 46 across the side walls 42 over the open top end of the tray. Thus, the tray can be slid into engagement with the cooking grill 11 with the side rods 22 of the grill received under these bent flanges or edges 42' so as to support the tray under the grill. An advantage of having the tray slidably connected is that the combustible product placed in the tray can be easily ignited and replenished by pulling the tray from under the cooking grill while keeping a portion thereof in sliding engagement with the grill.

As shown in FIG. 2, the support base 12 is herein comprised of a substantially rectangular frame formed by vertical leg posts 50 disposed in the corners of the rectangular frame and interconnecting rods 51 disposed in an elevated position whereby to support wood thereover. A fire-lighting or kindling substance may be positioned under the rods 51 on which would be positioned logs.

Figure 5:
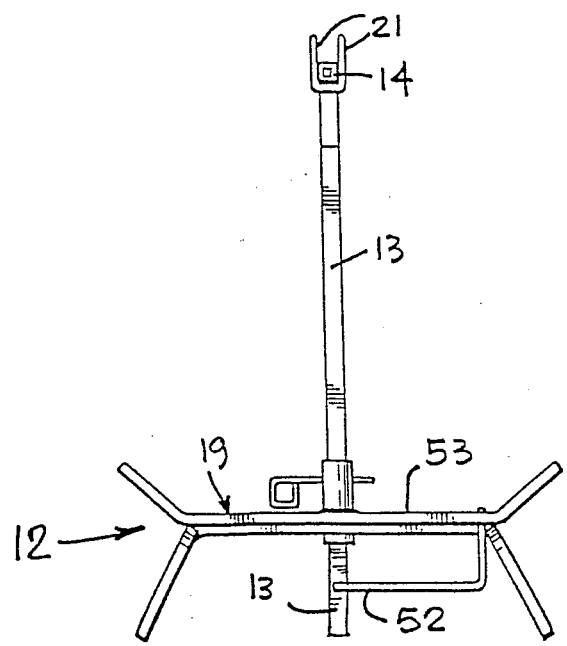
FIG. 5 is a front view of the support frame of FIG. 4.

As shown in the embodiment of the support base of FIGS. 4 and 5, the conventional wood grate 19, as herein shown, is provided with two U-shaped support rods 52 thereunder. These support rods are used to support a combustible fire-lighting substance thereon with the kindling and logs positioned on the upper surface 53 of the wood grate.

It is within the ambit of the present invention to cover any obvious modification of the preferred embodiment described herein, provided such modifications fall within the scope of the appended claims.

I claim:

1. A multi-purpose support frame for supporting a cooking grill in an elevated position, said support frame comprising a support base, a telescopic support rod secured to said base and extending vertically above an end of said base, a support arm secured to said rod and extending above and over said support base, said support arm having spaced apart attachment means for engaging cooperating parts of said grill for retaining said grill substantially horizontally above said support base, said attachment means being comprised by a bore in a forward end of said support arm, and a pair of spaced apart hook fingers extending close to a rear end of said support arm, each finger extending rearwardly and spaced on a respective side of said support arm and above a common face of said grill, said grill being adjustably positioned in height above said support base by an adjustment member secured to said support rod, and handle means associated with said grill and having a grill section with a detachably securable end for securing same to said cooking grill to provide an extension thereof, and a handle at an opposed end of said grill section, said cooking grill having opposed substantially parallel outer edge wire rods and a plurality of spaced transverse wire rods, and an inwardly turned finger rod secured to an outer end one of said transverse wire rods and spaced substantially parallel below the horizontal plane of said cooking grill, said cooking grill being retained substantially horizontal on said support arm with some of said transverse wire rods resting in part on said support arm and said hook fingers engaging over one of said transverse wire rods and said finger rod received in engagement in said bore in said forward end of said support arm.

2. A support frame as claimed in claim 1 wherein said grill section is comprised by opposed parallel wire rods having spaced apart transverse rods secured therebetween, said opposed parallel wire rods having hooks formed integral with a common free end thereof for engaging a wire rod in said cooking grill.

3. A support frame as claimed in claim 1 wherein there is further provided a support tray detachably securable under said cooking grill, vent means associated with said tray for providing oxygenation to a combustible product positioned in said tray 4. A support frame as claimed in claim 3 wherein said tray comprises a bottom wall, and opposed side and end vertical walls, said bottom wall having recessed cavity therein for receiving a combustible product, and vent holes in at least a side wall portion of said cavity and constituting said vent means.

5. A support frame as claimed in claim 4 wherein said opposed side walls extend above a top edge of said opposed end walls, said side walls having an outer end edge thereof bent inwardly of said tray to form an open-ended channel across said side walls, said cooking grill having opposed substantially parallel outer edges receivable under said outer end edges by sliding said tray from an outer end of said cooking grill opposite said handle means.

6. A support frame as claimed in claim 1 wherein said bore and said finger rod are of like cross-section and have at least one cooperating straight wall section to prevent axial rotation of said finger rod within said bore.

7. A support frame as claimed in claim 1 wherein said support base is a firewood support grate on which firewood may be supported.

8. A support frame as claimed in claim 6 wherein said support base is a frame having spaced vertical leg posts and intermediate connecting rods to support said telescopic rod vertically and said grill substantially horizontal thereover.

9. A support frame as claimed in claim 1 wherein said telescopic rod has a lower sleeve portion secured to said support base and in which is received a vertical rod, said adjustment member being a lock pin extending through a selected one of holes provided spaced apart in a section of said vertical rod, said vertical rod also being axially displaceable within said lower sleeve portion.

* * * * *